Oct. 31, 1961 E. C. ELSNER Re. 25,069
WEB-TENSIONING BUCKLE
Original Filed Dec. 17, 1956 2 Sheets-Sheet 1
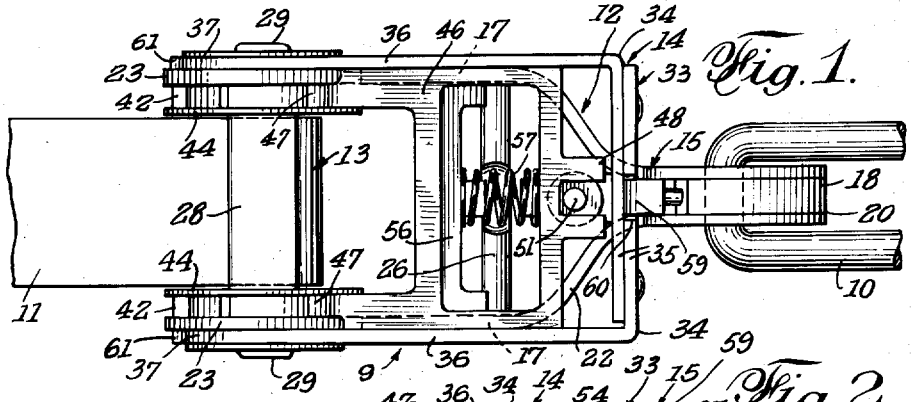
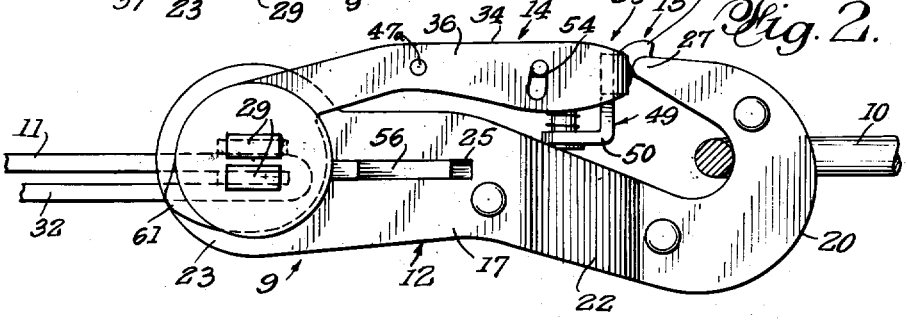
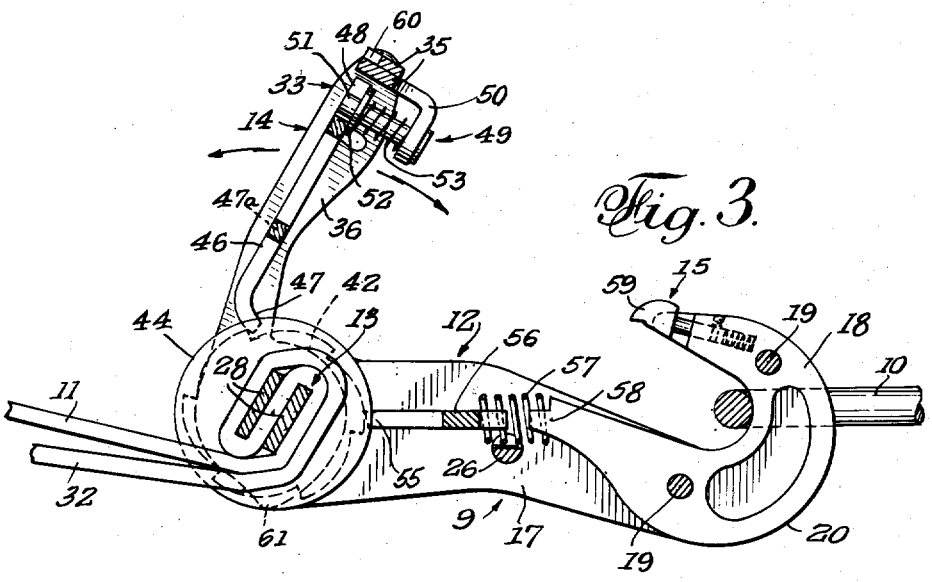
INVENTOR.
EDWIN C. ELSNER
BY C. G. Stratton
ATTORNEY WEB-TENSIONING BUCKLE
Original Filed Dec. 17, 1956 2 Sheets-Sheet 2
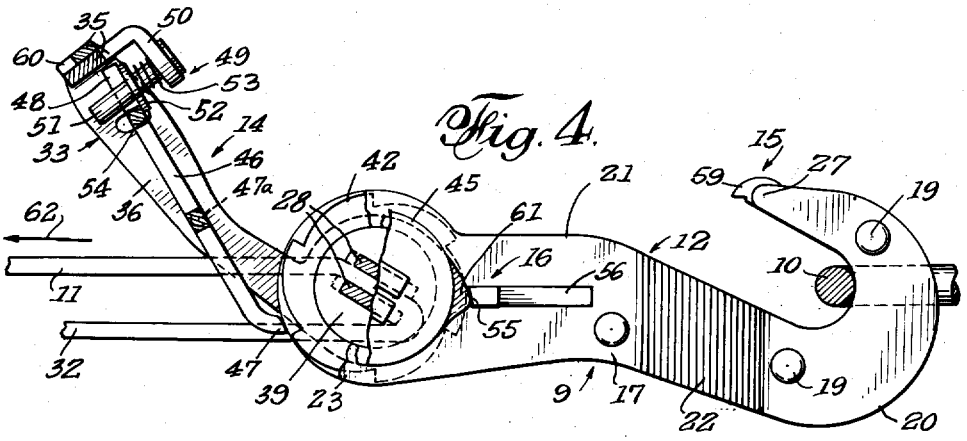
Fig. 4.
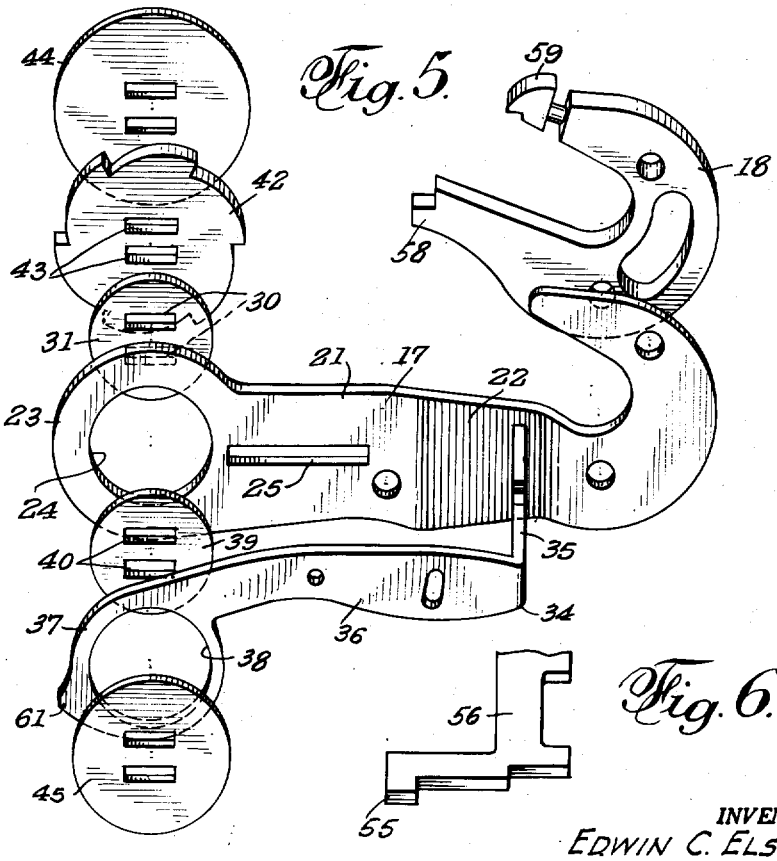
Fig. 5.
Fig. 6.
INVENTOR.
EDWIN C. ELSNER
BY C. G. Stratton
ATTORNEY United States Patent Office Re. 25,069
Reissued Oct. 31, 1961

25,069
WEB-TENSIONING BUCKLE

Edwin C. Elsner, Pasadena, Calif., assignor, by mesne assignments, to Aeroquip Corporation, Jackson, Mich., a corporation of Michigan Original No. 2,874,431, dated Feb. 24, 1959, Ser. No. 628,771, Dec. 17, 1956. Application for reissue June 6, 1960, Ser. No. 34,348
11 Claims. (Cl. 24—77)

Matter enclosed in heavy brackets [ ] appears in the original patent but forms no part of this reissue specification; matter printed in italics indicates the additions made by reissue.

This invention relates to a web-tensioning buckle and has for an object to provide a buckle embodying manually-operable means for increasing the tension or tautness of a web or strap, the same having a power advantage that enables the application of forces far greater than can be obtained by manual pull on the web or strap.

Another object of the invention is to provide a buckle of the character indicated that may be latched to insure retention of the tautness of the web or strap.

A further object of the invention is to provide a web-tensioning buckle that has a tautening range of operation, a locked or latched position at one side or end of said range of operation, and a release position on the opposite side or end of said range.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 1 is a plan view of a web-tensioning buckle according to the present invention.

FIG. 2 is a side elevational view thereof in latched position.

FIG. 3 is a longitudinal sectional view showing said buckle in the position thereof during a web-tensioning operation.

FIG. 4 is a partial side elevational and partial longitudinal sectional view showing said buckle in release position.

FIG. 5 is a perspective view of the parts comprising one side of the buckle, the parts on the opposite side being shown in exploded or separated relationship.

FIG. 6 is a broken perspective view of an element of the buckle.

The present buckle 9 is shown as connecting a tension-receiving member such as a loop or eye 10 and a strap 11. The loop or eye is exemplary of any non-adjustable connection means and may comprise a strap loop or the like. The strap 11 may be woven in the flat form shown of nylon webbing or comparable material. Regardless how otherwise made, the strap 11 is preferred to be of such pliability as to be foldable on itself in fairly tight folds or convolutions.

The buckle 9 that is illustrated comprises, generally, a frame 12, web connection means 13 spanning across the frame, means 14 for operating the means 13 to increase tension or tautness in a web or strap 11 connected to said means 13, means 15 to latch the means 14 to the frame to hold the tension produced by the means 14, and means

16 for effecting release of the tautened web, when the same is desired.

The frame 12 is shown as formed of sheet metal side pieces 17 between which is disposed a filler piece 18, rivets 19 permanently connecting said pieces to form a strong hook 20 at one end of the frame.

The side pieces 17, at the opposite end, are transversely spaced to form frame sides 21, transition sloping portions 22 connecting said frame sides [22] *21* and the parts of the pieces 17 that are directly connected to the filler piece. Formed in this manner, the frame 12 is generally Y-shaped in plan with the hook 20 comprising the leg and the sides 21 of the arms.

The ends 23 of the frame sides 21 are rounded, as in FIG. 5, a large central and circular hole 24 being formed in each said end. The sides 21 are shown as provided with slots 25 that extend from spaced relation to the holes 24 toward the hooks 20.

The frame may be strengthened by means of a cross pin 26 between the frame sides 21, the same being so located as to resist convergence of said frame sides under tension or pull between hook 20 and the opposite end of the frame. The loop 10 is connected with said hook as by passing the same over the open end 27 of the latter.

The web-connection means 13 comprises a pair of plates 28, the same being arranged in spaced parallel relation to accommodate between them the strap 11, said plates being provided with end tongues 29 that are narrower than the plates themselves. Said tongues are entered in slots 30 provided in discs 31 which fit into the mentioned holes 24 in the arms 21 of the buckle frame. Thus, the plates 28 may rotate together with the discs 31 in the bearings afforded by said holes 24.

It will be understood that the web 11, after being passed through the space between the connection plates 28, is doubled back to form an end 32. Assuming the strap or web 11 to be engaged over cargo with its opposite end fastened down or even looped back and connected to eye 10, a pull on the end 32 will tauten said web only to the degree of manual force that may be applied by such pull. In the present case, it is intended that end 32 be held, whether or not the same is being tensioned, while the means 14 is being manipulated.

Said means 14 comprises an arm 33 that is formed of substantially similar arm parts 34 that are connected by transverse ends 35 thereof in a rectangular arrangement in which the sides 36 of said arm parts terminate in round portions 37 that have holes 38 similar to and aligned with the bearing holes 24 in the frame sides 21.

Said arm 33 constitutes a member that is adapted to be oscillated around discs 39 that are similar to discs 31 and have the plate tongues 29 extending through the slots 40 therein.

The means 14 further includes a ratchet wheel 42 disposed inward of each disc 31 and, therefore, inward of each frame end 23, the same being provided with slots 43 through which the mentioned plate tongues 29 project. Inner discs 44 and outer discs 45, each slotted for said tongues 29, enclose the assembly, on each side, of ratchet wheel 42, discs 31 and 39 and the frame and crank arm portions 23 and 37, respectively. The tongues are peened or swaged over the discs 45 to maintain the assembly.

Another component of the means 14 is a pawl frame 46 that is carried between and by the arm sides 36, as may be seen in FIG. 1, by pivots 47a. Said pawl frame, at one end, is provided with a drive pawl 47 engaged with the teeth of each ratchet wheel 42 and, at the other end, with a bifurcation 48 that is engaged by spring-biased means 49. The latter means is shown as a bracket 50 provided on one of the ends 35 of the arm parts 36, a pin 51 carried by said bracket and extending into the bifurcation 48, a disc or washer 52 slidably carried on said pin beneath the bifurcation, and a spring 53 biasing said washer and the bifurcated end of pawl frame 46 in a direction to hold pawls 47 into engagement with the teeth of ratchet wheels 42 and allowing frame 46 to ratchet with respect to said teeth.

The ratcheting movement of the frame 46 is limited by a pin and slot connection 54 between said frame and each part 34 of arm 33 to hold said pawl frame generally within the confines of the arm.

It will be understood that, as the arm 33 is cranked back and forth, the ratchet wheel 42 will be intermittently advanced, causing intermittent rotation of the web-engaging plates 28. If the end 32 of said web is held reasonably taut, such rotation or winding up of the web-connection means 13 will cause the same to build up, as in FIG. 3, to, thereby, increase the tension on web 11, accordingly.

Such ratchet-tautening of the means 13 is retained by a dog 55 which is provided on each side of a dog plate 56. Said plate is guided in the slots 25 of the buckle frame and is biased into ratchet-holding position by a spring 57 that is carried by an extension 58 of the filler piece 18.

The arm 14 is held releasably latched, when not in use as a web tautener, by means 15, the same closing the otherwise open hook 20, as best seen in FIG. 2. Said means 15 is shown as a spring-biased latch 59 on the open end 27 of said hook, the same being biased in a direction to snap into engagement with a shoulder 60 on the arm, when the latter is moved to its down or closed position, as in said FIG. 2. Manual retraction of latch 59 frees said arm 14 for web-tautening cranking oscillation, as above described.

Since dogs 55 hold the tautened position, the arm may be moved to close position after its last tensioning stroke. With the arm 14 latched, this condition is maintained until increased tensioning is desired, in which case the above procedure is repeated, or until it is desired to release the tension on web 11. In the latter case, the arm is released and swings back to the position of FIG. 4 to bring the means 16 into operation. Said latter means comprises a projection 61 on each arm portion 37, said projections being so located, angularly, that, during the normal cranking movement of the arm, the same do not achieve engagement with the dogs 55. However, as seen in FIG. 4, upon swinging the arm further back that, normally, the projections 61 engage dogs 55 and cam the latter away from engagement with the ratchet teeth. Now, the tension force on web 11 pulls in the direction of arrow 62 to unwind the wound-up web on the means 13. Since pawl frame 46 is in ratchet-teeth engagement, manual pressure on the bifurcated end thereof will serve to free the pawls 47 from the ratchet teeth, this release position being shown in FIG. 4. Thus released, the buckle and web 11 may be separated or the hook of the buckle may be removed from connection with loop 10.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A web-tensioning buckle comprising a frame provided with an end adapted to be connected to a tension-receiving member, an open hook on the frame to which the tension-receiving member is connected, web-connection means carried by the other end of said frame, manually-operable means carried by the frame to intermittently rotate the web-connection means to foreshorten the web connected therewith and to increase the tension thereon relative to the tension-receiving member, said hook and the manually-operable member cooperating to constitute enclosed means confining the tension-receiving member, means to releasably latch said manually-operable means in non-operating condition, said latch means inter-engaging the open end of said hook and the manually-operable member, and means to disconnect the web-connection means from the manually-operable means to allow the stored-up force of the tension on the web to move the web-connection means to tension-released position, the last-mentioned means being operable only upon release of the latch means.

2. A web-tensioning buckle comprising a frame provided with an end adapted to be connected to a tension-receiving member, web connection means carried by the other end of said frame, manually-operable means carried by the frame to intermittently rotate the web-connection means to foreshorten the web connected therewith and to increase the tension thereon relative to the tension-receiving member, said manually-operable means comprising a crank arm, ratchet means operated by said arm, and a releasable dog to hold the ratchet means during recovery movement of the arm, said releasable dog being engaged by a portion of the crank arm to effect disconnection of the web-connection and manually-operated means, means to releasably latch said manually-operable means in non-operating condition, and means to disconnect the web-connection means from the manually-operated means to allow the stored-up force of the tension on the web to move the web-connection means to tension-released position, the last-mentioned means being operable only upon release of the latch means.

3. In a web-tensioning buckle, a crank, a crank-operated ratchet wheel, web-connection means intermittently rotated with the ratchet wheel during reciprocative movements of the crank to wind up a web on the connection means, means to latch the crank to non-operating position, dog means to hold the wound-up tension on the connection means, and means on the crank to release said dog means.

4. In a web-tensioning buckle, a crank, a crank-operated ratchet wheel, web-connection means intermittently rotated with the ratchet wheel during reciprocative movements of the crank to wind up a web on the connection means, means to latch the crank to non-operating position, dog means to hold the wound-up tension on the connection means, and an offset camming surface rigidly mounted on the crank to free the dog means and release the wound-up tension.

5. A web-tensioning buckle comprising a frame having a hook at one end, a rotational bearing at the other end, web-connection means rotationally carried by said bearing, a ratchet wheel affixed to the connection means, an arm rotationally carried by said bearing and movable in an arc toward and from the frame hook, a pawl carried by the arm to intermittently rotate the ratchet and the web-connection means, a dog carried by the frame to retain the rotated position during recovery movement of the arm and pawl, and means to latch the free end of the arm to the hook to close the latter.

6. A web-tensioning buckle comprising a frame having a hook at one end, a rotational bearing at the other end, web-connection means rotationally carried by said bearing, a ratchet wheel affixed to the connection means, an arm rotationally carried by said bearing and movable in an arc toward and from the frame hook, a pawl carried by the arm to intermittently rotate the ratchet and the web-connection means, a dog carried by the frame to retain the rotated position during recovery movement of the arm and pawl, means to latch the free end of the arm to the hook to close the latter, and means carried by said arm and movable, upon movement of the arm to a position beyond its normal cranking movement positions, to release the dog and, therefore, the ratchet wheel and the web-connection means.

*7. A web-tensioning buckle comprising a frame provided with an end adapted to be connected to a tension-receiving member, web connection means carried by the other end of said frame, manually-operable means carried by the frame to intermittently rotate the web-connection means to foreshorten the web connected therewith, to increase the tension thereon relative to the tension-receiving member, and to clamp the web in tension, said manually-operable means comprising a crank arm, ratchet means operated by said arm, and a releasable dog to hold the ratchet means during recovery movement of the arm, said releasable dog being engaged by a portion of the crank arm to effect disconnection of the web-connection and manually-operated means, and means to disconnect the web-connection means from the manually-operated means to allow the stored-up force of the tension on the web to move the web-connection means to tension-released position.*

*8. A buckle for use in tensioning and clamping in tensioned relation adjacent web ends comprising a frame provided with an end adapted to be connected to a tension-receiving member, web-connection means carried by the other end of said frame, said web-connection means comprising a pair of plates arranged in spaced parallel relation to accommodate therebetween a length of web and including means for positioning and laterally confining said length of web on said plates, manually-operable means carried by the frame to intermittently rotate the web-connection means to foreshorten the web connected therewith, increase the tension thereon relative to the tension-receiving member, and clamp said web in tension, said manually-operable means comprising a crank arm, ratchet means operated by said arm and a releasable dog to hold the ratchet means during recovery movement of the arm, said releasable dog being engaged by a portion of the crank arm to effect disconnection of the web-connection and manually-operated means, and means to disconnect the web-connection means from the manually-operated means to allow the stored-up force of the tension on the web to move the web-connection means to tension-released position, whereby adjacent web ends may be successively tensioned relative to each other, clamped in tensioned condition and released from clamped and tensioned condition.*

*9. The buckle of claim 8 wherein said means for positioning and laterally confining said length of web on said plates comprises a pair of discs lying in substantially parallel relation to each other and spaced apart from each other a distance approximately equal to the width of said web.*

*10. A buckle for use in tensioning adjacent web ends and clamping said web ends in tensioned condition, comprising a frame having substantially parallel side members and ends, a tension-receiving member adjacent one end of said frame, web-connection means adjacent the other end of said frame, said web-connection means comprising a pair of plates rotatably mounted transversely of said side members of said frame and in spaced parallel relation to accommodate therebetween a length of web, ratchet means carried by said plates, means for positioning and laterally confining said length of web on said plates, a U-shaped crank arm including legs pivotally mounted at the free ends thereof on said side members of said frame, a pawl disposed generally between the legs of said crank arm and pivotally secured thereto at a point on said pawl which lies between a ratchet-engaging end thereof and an actuating end thereof for selectively connecting and disconnecting said web-connection means and said crank arm, and a releasable dog to hold said ratchet means during recovery movement of said crank arm, said releasable dog being engageable by a cam surface formed on said crank arm in one position of said crank arm to release said web-connection means.*

*11. A buckle as defined in claim 10 wherein said releasable dog is transversely mounted between said side members of said frame for guided sliding movement longitudinally thereof, said dog being spring-urged into releasable engagement with said ratchet means.*

References Cited in the file of this patent or the original patent

UNITED STATES PATENTS

| | | |
|---|---|---|
| 380,995 | Crandall | Apr. 10, 1888 |
| 673,103 | Williamson et al. | Apr. 30, 1901 |
| 1,904,178 | Vaugn | Apr. 18, 1933 |
| 2,363,138 | Moore | Nov. 21, 1944 |
| 2,679,670 | Griswold | June 1, 1954 |